United States Patent
Young et al.

(10) Patent No.: US 6,243,466 B1
(45) Date of Patent: Jun. 5, 2001

(54) AUTO-ESCROWABLE AND AUTO-CERTIFIABLE CRYPTOSYSTEMS WITH FAST KEY GENERATION

(76) Inventors: Adam Lucas Young, 535 W. 110th St., Apt. 12J; Marcel Mordechay Yung, 605 W. 112th St., Apt. 4H, both of New York, NY (US) 10025

( * ) Notice: Subject to any disclaimer, the term of this patent is extended or adjusted under 35 U.S.C. 154(b) by 0 days.

(21) Appl. No.: 08/920,504

(22) Filed: Aug. 29, 1997

(51) Int. Cl.$^7$ ........................................ H04L 9/30
(52) U.S. Cl. .................... 380/28; 380/277; 380/286
(58) Field of Search .................... 380/286, 30, 28

(56) References Cited

U.S. PATENT DOCUMENTS

| | | |
|---|---|---|
| 4,200,770 | 4/1980 | Hellman et al. . |
| 4,218,582 | 8/1980 | Hellman et al. . |
| 4,405,829 | 9/1983 | Rivest et al. . |
| 4,424,414 | 1/1984 | Hellman et al. . |
| 4,625,076 | 11/1986 | Okamoto et al. . |
| 4,641,346 | 2/1987 | Clark et al. . |
| 4,748,668 | 5/1988 | Shamir et al. . |
| 4,881,264 | 11/1989 | Merkle . |
| 4,933,970 | 6/1990 | Shamir . |
| 4,995,082 | 2/1991 | Schnorr . |

(List continued on next page.)

OTHER PUBLICATIONS

Micali, Fair Public–Key Cryptosystems, 1992, pp. 113–138.*
De Santis et al, How to Share a Function Securely, 1994.*
Schneier, Applied Cryptography, Oct. 17, 1996, pp. 476–479.*
"Provably Secure and Practical Identification Schemes and Corresponding Signature Schemes", Tatsuaki Okamoto, pp 32–53.

(List continued on next page.)

*Primary Examiner*—Gail Hayes
*Assistant Examiner*—Jeffrey Scott Leaning
(74) *Attorney, Agent, or Firm*—Schweitzer Cornman Gross & Bondell LLP (57) ABSTRACT

A method is provided for an escrow cryptosystem that is overhead-free, does not require a cryptographic tamper-proof hardware implementation (i.e., can be done in software), is publicly verifiable, and cannot be used subliminally to enable a shadow public key system. A shadow public key system is an unescrowed public key system that is publicly displayed in a covert fashion. The keys generated by the method are auto-recoverable and auto-certifiable (abbrev. ARC). The ARC Cryptosystem is based on a key generation mechanism that outputs a public/private key pair, and a certificate of proof that the key was generated according to the algorithm. Each generated public/private key pair can be verified efficiently to be escrowed properly by anyone. The verification procedure does not use the private key. Hence, the general public has an efficient way of making sure that any given individual's private key is escrowed properly, and the trusted authorities will be able to access the private key if needed. Since the verification can be performed by anyone, there is no need for a special trusted entity, known in the art as a "trusted third party". Furthermore, the system is designed so that its internals can be made publicly scrutinizable (e.g., it can be distributed in source code form). This differs from many schemes which require that the escrowing device be tamper-proof hardware. The system has a novel feature that the system parameters can be generated very efficiently and at the same time provide a very high level of security. Another novel feature is a method for making the certificates of recoverability publishable. The system is applicable for law-enforcement, file systems, e-mail systems, certified e-mail systems, and any scenario in which public key cryptography can be employed and where private keys or information encrypted under public keys need to be recoverable.

2 Claims, 5 Drawing Sheets

U.S. PATENT DOCUMENTS

| | | |
|---|---|---|
| 5,005,200 | 4/1991 | Fischer . |
| 5,097,504 | 3/1992 | Camion et al. . |
| 5,231,668 | 7/1993 | Kravitz . |
| 5,276,737 | 1/1994 | Micali . |
| 5,315,658 | 5/1994 | Micali . |
| 5,557,346 | 9/1996 | Lipner et al. . |
| 5,557,765 | 9/1996 | Lipner et al. . |
| 5,633,928 | 5/1997 | Lenstra et al. . |
| 5,633,929 * | 5/1997 | Kaliski, Jr. .............................. 380/23 |
| 5,640,454 | 6/1997 | Lipner et al. . |
| 5,647,000 | 7/1997 | Leighton . |
| 5,796,830 | 8/1998 | Johnson et al. . |
| 5,815,573 | 9/1998 | Johnson et al. . |

OTHER PUBLICATIONS

Federal Register / vol. 62, No. 92 / Tuesday, May 13, 1997 / Notices, pp26293, 26294.

R. Anderson, M. Roe, "The GCHQ Protocol and Its Problems", Eurocrypt '97, pp. 134–148, Springer–Verlag 1997.

M. Bellare, P. Rogaway, "Optimal Asymmetric Encryption", Eurocrypt '94, pp. 92–111, Springer–Verlag, 1994.

D. Chaum, "Blind Signatures For Untraceable Payments".

D. Chaum, T.P. Pedersen, "Wallet Databases with Observers".

D. Denning, D. Branstad, "A Taxonomy for Key Escrow Encryption Systems", Communications of the ACM, v. 39, n. 3, , 1996.

A. De Santis, Y. Desmedt, Y. Frankel, M. Yung, "How to Share a Function Securrely", ACM STOC '94, pp. 522–533, 1994.

Y. Desmedt, Y. Frankel, "Threshold cryptosystems", CRYPTO '89, pp. 307–315, Springer–Verlag, 1989.

Y. Desmedt, "Securing Traceability of Ciphertexts—Towards a Secure Software Key Escrow System", Eurocrypt '95, pp. 147–157, Springer–Verlag, 1995.

W. Diffie, M. Hellman, "New Directions in Cryptography", IEEE Transactions on Information Theory, 22, pp. 644–654, 1976.

T. ElGamal, "A Public Key Cryptosystem and a Signature Scheme Based on Discrete Logarithms", CRYPTO '84, pp. 10–18, Springer–Verlag, 1985.

P. Feldman, "A Practical Scheme for Non–interactive Verifiable Secret Sharing", 28th annual FOCS, pp. 427–437, 1987.

A. Fiat, A. Shamir, "How to Prove Yourself: Practical Solutions to Identification and Signature Problems", CRYPTO '86, pp. 186–194, Springer–Verlag, 1987.

Y. Frankel, M. Yung, "Escrow Encryption Systems Visited: Attacks, Analysis and Designs", CRYPTO '95, Springer–Verlag, 1995.

R. Ganesan, "How To Use Key Escrow", Communications of the ACM, v. 39, n.3, page 33, 1996.

S. Goldwasser, S. Micali, R. Rivest, "A Digital Signature Scheme Secure Against Adaptive Chosen–Message Attacks", SIAM Journal on Computing, vol 17, n. 2, 1988.

IBM, SecureWay, key recovery technology document, available at http://www.ibm.com/Security/html/wp–keyrec.html (downloaded May 25, 1997).

N. Jefferies, C. Mitchell, M. Walker, "A Proposed Architecture for Trusted Third Party Services", Cryptography: Policy and Algorithms, LNCS 1029, Springer, 1996.

J. Kilian, F. Leighton, "Fair Cryptosystems, Revisited", CRYPTO '95, pp. 208–221, Springer–Verlag, 1995.

L. Lacy, D. Mitchell, W. Schell, "CryptoLib: Cryptography in Software", AT&T Bell Labs, Crypto@research.att.com.

A. Lenstra, P. Winkler, Y. Yacobi, "A Key Escrow System with Warrant Bounds", CRYPTO '95, pp. 197–207, Springer–Verlag, 1995.

S. Micali, "Fair Public–Key Cryptosystems", CRYPTO '92, pp. 113–138, Springer–Verlag, 1992.

K. Nyberg, R. Rueppel, "Message Recovery for Signature Schemes Based on the Discrete Logarithm Problem".

T.P. Pedersen, "A Threshold Cryptosystem without a Trusted Party".

E. Verheul, H. Tilborg, "Binding ElGamal: A Fraud–Detectable Alternative to Key–Escrow Proposals", Eurocrypt '97, pp. 119–133, Springer–Verlag, 1997.

S. Walker, J. Winston, "Principles for Use of Encryption and Key Recovery", available at http://www.tis.com/docs/products/recoverkey/recoverkey.html (downloaded May 25, 1997).

A. Young, M. Yung, "Kleptography: Using Cryptography Against Cryptography", Eurocrypt '97, pp. 62–74, Springer–Verlag, 1997.

"Digital Systems", CRC Handbook of Applied Cryptography, Ch 11, pp. 425–444.

"Digital Systems", CRC Handbook of Applied Cryptography, Ch 11, pp. 445–464.

"Digital Systems", CRC Handbook of Applied Crytography, Ch 11, pp. 465–481.

* cited by examiner

AUTO-ESCROWABLE AND AUTO-CERTIFIABLE CRYPTOSYSTEMS WITH FAST KEY GENERATION

BACKGROUND

1. Field of Invention

The field of this invention is cryptography. This invention relates to cryptosystems, and in particular to the escrowing and recovering of cryptographic keys and data encrypted under cryptographic keys. The escrow and recovery process assures that authorized entities like law-enforcement bodies, government bodies, users, and organizations, can when allowed or required, read encrypted data. The invention relates to cryptosystems implemented in software, but is also applicable to cryptosystems implemented in hardware. In particular, the invention relates to fast generation of cryptographic keys, and public certification thereof.

2. Description of Prior Art

Public Key Cryptosystems (PKC's) allow secure communications between two parties who have never met before. The notion of a PKC was put forth in (W. Diffie, M. Hellman, "New directions in cryptography", IEEE Transactions on Information Theory, 22, pages 644–654, 1976). This communication can take place over an insecure channel. In a PKC, each user possesses a public key E and a private key D. E is made publicly available by a key distribution center, also called certification authority (CA), after the registration authority verifies the authenticity of the user (its identification, etc.). The registration authority is part of the certification authority. D is kept private by the user. E is used to encrypt messages, and only D can be used to decrypt messages. It is computationally impossible to derive D from E. To use a PKC, party A obtains party B's public key E from the key distribution center. Party A encrypts a message with E and sends the result to party B. B recovers the message by decrypting with D. The key distribution center is trusted by both parties to give correct public keys upon request. A PKC based on the difficulty of computing discrete logarithms was published in (T. ElGamal, "A Public-Key Cryptosystem and a Signature Scheme Based on Discrete Logarithms", CRYPTO '84, pages 10–18, Springer-Verlag, 1985).

Prior methods for conducting key escrow are U.S. Pat. Nos. 5,276,737, and 5,315,658 which are due to Micali (1994). In these patents Micali discloses a Fair Public Key Cryptosystem (FPKC) which is based on the work of P. Feldman (28th annual FOCS). The FPKC solution is not as efficient in terms of use as Auto-Escrowable and Auto-Certifiable Cryptosystems. Furthermore, It has been shown that the Fair RSA PKC does not meet certain needs of law enforcement (J. Kilian, F. Leighton, "Fair Cryptosystems Revisited", CRYPTO '95, pages 208–221, Springer-Verlag, 1995), since a shadow public key cryptosystem can be embedded within it. A shadow public key system is a system that can be embedded in a key escrow system that permits conspiring users to conduct untappable communications. Kilian and Leighton disclose a Fail-safe Key Escrow system. This system has the drawback that it requires users to engage in a costly multi-round protocol in order to generate public/private key pairs. Other key escrow systems with similar inefficiencies are by De Santis et al., Walker and Winston (TIS), and the IBM SecureWay document. A "Fraud-Detectable Alternative to Key-Escrow Proposals" based on ElGamal has been described in (E. Verheul, H. van Tilborg, "Binding ElGamal: A Fraud-Detectable Alternative to Key-Escrow Proposals", Eurocrypt '97, pages 119–133, Springer-Verlag, 1997). This system, called Binding ElGamal, provides for session level key recoverability, and makes no provision for preventing users from encrypting messages using the provided unescrowed public key infrastructure prior to using the Binding ElGamal system. Hence, it permits conspiring criminals to conduct untappable communications. Binding ElGamal also imposes a large amount of communication overhead per communications session. An overview of key escrow schemes appears in (D. Denning, D. Branstad, "A Taxonomy for Key Escrow Encryption Systems," Communications of the ACM, v. 39, n. 3, 1996). In (N. Jefferies, C. Mitchell, M. Walker, "A Proposed Architecture for Trusted Third Party Services", Cryptography: Policy and Algorithms, LNCS 1029, Springer, 1996) and (R. Anderson, "The GCHQ Protocol and Its Problems", Eurocrypt '97, pages 134–148, Springer-Verlag, 1997) a trusted third party approach to escrow is described where the trusted third parties of the participating users are involved in every session key establishment stage, and hence provides for another cumbersome solution as well.

In the pending U.S. Pat. Nos. 08/864,839 and 08/878,189 (by Young and Yung), an auto-recoverable and auto-certifiable public key cryptosystem was disclosed that has the following properties. Users of the system can generate a public/private key pair and a certificate of recoverability. This certificate of recoverability can be used to both recover the private key by the escrow authorities, and verify that the private key is recoverable. The present invention draws many of its ideas from the Auto-Escrowable and Auto-Certifiable key escrow solution. The primary drawback of the auto-recoverable and auto-certifiable cryptosystem that was proposed is that it is not possible to easily generate very large cryptographic keys for use in the system. The patent of Young and Yung cites a 1024 bit prime, which is secure by todays standards. This number is a prime r such that $2r+1$ is prime and such that $4r+3$ is prime. The requirement that all three numbers r, $2r+1$, and $4r+3$ be prime is a constraint. A weaker constraint that eases the key generation would be a constraint between two numbers only. The present invention discloses an auto-recoverable and auto-certifiable cryptosystem which uses an entirely different algebraic structure for the escrow authority keys. Namely, the system uses a prime number p such that $p=2tn+1$. Here, t is a small strong prime and n is the product of two primes. With this algebraic structure for the prime p, keys of size 4096 bits or greater can be easily generated.

Another drawback of the Auto-Recoverable and Auto-Certifiable cryptosystem is that it does not provide a way to make public the certificates of recoverability without risking the introduction of a shadow public key system. The present invention discloses a way to blind the certificates, thereby allowing them to be published safely.

Both Binding ElGamal and the Auto-Escrowable and Auto-Certifiable Cryptosystems solutions employ the use of non-interactive zero-knowledge proofs. More specificly, they employ the Fiat Shamir heuristic which is disclosed in (A. Fiat, A. Shamir, "How to Prove Yourself: Practical Solutions to Identification and Signature Problems", CRYPTO '86, pages 186–194, Springer-Verlag, 1987).

SUMMARY OF THE INVENTION

The present invention provides a method to verify that a user generated private key is contained within an encryption under the public key of the escrow authorities without excessive overhead. Furthermore, this verification can be performed by anyone in possession of the escrow authorities public key. The present invention consists of a setting up process and three functions which process signals in different ways. The functions are key generation, key verification, and key recovery. In the setup process of the prefered embodiment, the participants agree upon a set of initial public parameters and the authorities generate an escrowing public key and corresponding private keys. The initial parameters and the escrowing public key are the public parameters of the system. The escrowing authorities, Certification Authority (CA), and users of the system all have access to the public parameters. In the key generation process, the method generates a user's public/private key pair, and a certificate of recoverability which is a string of information which includes an encryption of the user's private key under the escrowing public key. The signal information containing the user's public key, and the certificate of recoverability can be transmited to any entity. In the verification process, the user transmits this signal to the verifier. The verification process takes the input signal, processes it, and outputs either true or false. A result of true indicates that the user's private key is recoverable from the certificate of recoverability by the escrow authorities. A result of false indicates that the private key is not recoverable. The invention is designed such that it is intractable for the user to generate a public key, and certificate of recoverability such that the key is not escrowed and such that it passes the verification process with a result of true. In the prefered embodiment, the users certify their public keys with the registration authority of the certification authority (CA) who then signs their public key after successful verification. A public key together with a CA's signature on a string that contains the public key, the user's identity, and other information, constitutes a certified public key. The other information can include the certificate of recoverability in the present invention. In more detail, upon receiving the user's public key, and certificate of recoverability, the CA verifies that the corresponding private key is recoverable. If it is, (namely, the verification process outputs true) the public key is certified and/or made publicly available by the CA. The user is only required to keep his private key and to have access to the public key database containing public keys of other users as in a typical PKI. In the recovery process, the escrow authorities use the user's certificate of recoverability, which is obtained from the CA, as an input signal. The escrow authorities process the certificate of recoverability, and the corresponding user's private key or data encrypted using the corresponding public key is the resulting output signal.

The present invention is useful in any environment that demands the recovery of private keys, or keys encrypted under these keys, or information encrypted under these keys. Such environments arise in law enforcement nationally and internationally, in the business sector, in secure file systems, on the Internet, etc. The successful escrowing of private keys implies the successful escrowing of public key encrypted information, and hence the present invention has many applications.

The present invention is robust with respect to any underlying technology since it can be implemented in both hardware and software. When implemented in software it can be easily scrutinized to insure that it functions as desired and to insure that it does not compromise the security of its users. The software implementation allows for fast and easy dissemination of the invention, since it can be disseminated in source code form over diskettes or over a computer communication network. The present is also communication efficient. At most, one, two, or three message exchanges suffice for the various embodiments of the present invention. The signals can be processed quickly and the signals themselves constitute a small amount of information. The invention does not require changes in communication protocols used in typical unescrowed PKI's (e.g., session key establishment, key distribution, secure message transmission, etc.). The invention is therefore compatible with typical PKI's. The present invention thus provides a very efficient way of escrowing and recovering cryptographic keys. The present invention does not require changes in header information of messages, content of messages, or additional messages outside the PKI protocols.

THE DRAWING

The present invention will be described with reference to the accompanying FIGS. 1–7.

DESCRIPTION OF THE INVENTION

The following is a description of the prefered embodiment of the present invention. Variations on the prefered embodiment will accompany the description of the prefered embodiment wherever applicable. For convenience in the presentation, the hashing algorithm selected is SHA (Schneier 2nd edition, pages 442–445), though any cryptographic hashing algorithm will suffice in its place. In the prefered embodiment, parameters are chosen uniformly at random from their respective groups. Alternate embodiments include alterations of the probability distributions from which such values are chosen. Such choices based on random number generators or pseudo-random generators are available in the art.

Figure 1:
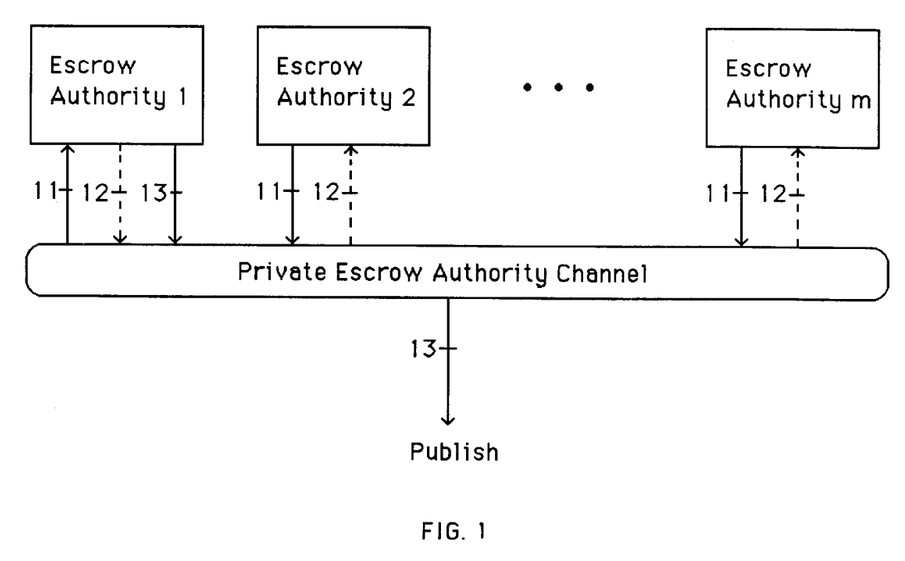
FIG. 1 is a data flow diagram of the process of setting up the method of the invention for use with m escrow authorities.

The system setup of the prefered embodiment shown in FIG. 1 initiates the cryptosystem. In the prefered embodiment, the escrow authorities share an integer $n=qr$, where $q$ and $r$ are prime. When n is generated, it is made sure that $\gcd(3,(q-1)(r-1))=\gcd(5,(q-1)(r-1))=1$. The generation continues by computing $p=2tn+1$, where t is drawn from the first, say 256 strong primes starting from 23, inclusive. If p is found to be prime using one of these values for t, then the values for n and p have been found. If none of the values for t causes p to be prime, this entire process is repeated as many times as necessary. Note that if t is a strong prime, then $t=2t'+1$ where t' is prime. Since we insist that $t>11$, we are guaranteed that $\gcd(3,2t'(q-1)(r-1))=\gcd(5,2t'(q-1)(r-1))=1$. Let m denote the number of escrow authorities. Once n and p are found, the escrow authorities generate the private shares $d_1, d_2, \ldots, d_m$ corresponding to the public exponent $e=3$. The method described in (A. De Santis, Y. Desmedt, Y.

Frankel, M. Yung, "How to Share a Function Securely", ACM STOC '94, pages 522–533, 1994) can be used to employ such shared values. Ideally, q and r are strong primes, to thwart known attacks. A value g which is chosen uniformly at random from $Z_{2m}^*$ is chosen such that g has an order that is at least as large as the smallest of q and r, in the field $Z_p$ (recall that the factorization of n is not known). The values t, n, and g are made public. The twin primes 3 and 5 will act as public key encryption exponents.

Figure 2:
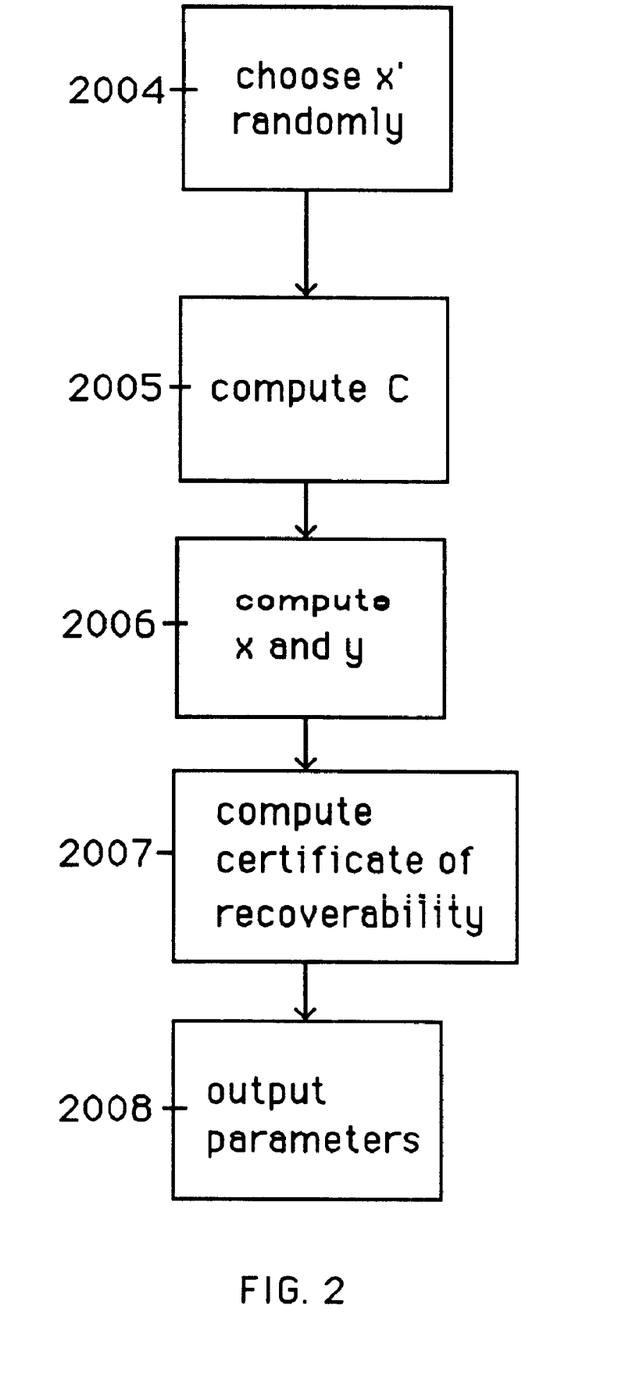
FIG. 2 is a flow chart of the basic steps of the process of generating a public/private key pair and certificate of recoverability using the invention.

FIG. 2 is a diagram showing the process of how a user's system generates a public/private key pair and a certificate of recoverability. Having obtained (and verified as much as possible) the signal t, n, and g that is made available to users by the escrow authorities, the user system proceeds to generate a public key (y, g, p) for the user. Note that this key is an ElGamal public key in every respect, except that g may have order q or r modulo p. The signal t, n, and g may a priori have been included in the invention. The invention proceeds by choosing a value x' in $Z_{2m}^*$ randomly. This is depicted by step 2004 in FIG. 2. In step 2005, the invention computes $C = x'^3 \mod 2tn$ and in step 2006 the invention computes the user's private key x such that $x = x'^2 \mod 2tn$. The invention also computes y to be $g^x \mod p$.

The system then proceeds to step 2007 and computes a certificate that can be used by any interested party to verify that the user's "private key" is properly encrypted within C. The certificate contains the value C. The system also processes three non interactive zero-knowledge proofs as they are called in the art and includes them in the certificate. Let N denote the number of repetitions in each non-interactive proof. The proofs are based on a cryptographic hash function, as they are called in the art. In the prefered embodiment, N is set to be 40. The first proof is designed so that the user can prove that he or she knows x' in C. The second proof is designed so that the user can prove that he or she knows x' in y. The last proof is designed so that the user can prove that he or she knows x' in (y raised to the C power mod p). By saying "the user knows value x'" we mean that the system has the value x' in its state. The last two proof systems prove knowledge of the root of the logarithm of a value. For example, in the second proof, this value is y. The square root of the log of y is x' in a properly generated certificate.

In more detail, to construct the non-interactive proofs, the system proceeds as follows. It chooses the values $a_{1,1}$, $a_{1,2}, \ldots, a_{1,N}, a_{2,1}, a_{2,2}, a_{2,3}, \ldots, a_{2,N}$ and $a_{3,1}, a_{3,2}, a_{3,3}, \ldots, a_{3,N}$ in $Z_{2m}^*$ randomly. For i ranging from 1 to N, the system sets $I_{1,i}$ to be $a_{1,i}^3 \mod 2tn$. For i ranging from 1 to N, the invention sets $I_{2,i}$ to be y raised to the $(a_{2,i}^2 \mod 2tn)$ power mod p. For i ranging from 1 to N, the invention sets $I_{3,i}$ to be $(y^C \mod p)$ raised to the $(a_{3,i}^5 \mod 2tn)$ power mod p. The invention then computes the value rnd to be the SHA hash of the set formed by concatenating together the tuples $(I_{1,i}, I_{2,i}, I_{3,i})$ for i ranging from 1 to N. Note that rnd is a function of all of the I values, using a suitably strong cryptographic hash function. In alternate embodiments, the hash function can have an effective range of size different than 160 bits. A greater range of the hash function allows for significantly larger values for N. The system sets each of the bit-sized values $b_{1,1}, b_{1,2}, \ldots, b_{1,N}, b_{2,1}, b_{2,2}, \ldots, b_{2,N}, b_{3,1}, b_{3,2}, \ldots, b_{3,N}$ to be each of the corresponding 3N least significant bits of rnd. There are a multitude of ways in which an embodiment can securely assign the bits of rnd to the values for b. The values for b are the challenge bits, and this method of finding them is known as the Fiat-Shamir Heuristic. The system then proceeds to compute the responses to these challenge bits. For i ranging from 1 to 3 and for j ranging from 1 to N, the invention sets $z_{i,j}$ to be $(a_{i,j}$ times (x' raised to the $b_{i,j}$ power)) mod 2tn. This completes the description of step 2007 of FIG. 2.

The system proceeds to step 2008. In step 2008, the invention outputs the parameters C, y, $(I_{1,i}, I_{2,i}, I_{3,i})$, and $(z_{1,i}, z_{2,i}, z_{3,i})$ for i ranging from 1 to N. In an alternate embodiment the value x' is output by the invention to the user. The user then has the option to later interactively prove that his or her private key x is recoverable by the escrow authorities. This will be addressed in more detail later. Also, the values b can be made a part of the certificate. This step is however, not necessary, since the values for b can be derived from the values for I alone.

Figure 3:
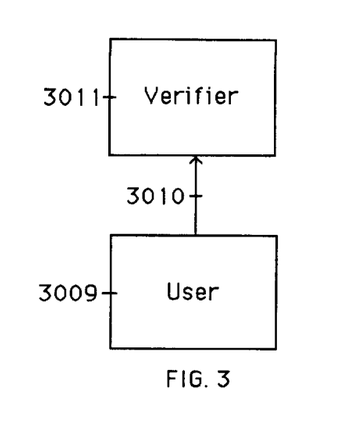
FIG. 3 is a data flow diagram of the process of verifying the recoverability of a private key.

The description of the embodiment has thus far explained how the system is setup for use by the CA and authorities, and how the system is used by users (potential receivers) to generate public/private key pairs and certificates of recoverability. These certificates are strings showing to anyone presented with them that the key generated has the publicly specified properties. The following describes how the invention is used by the user to prove to a verifier that x is recoverable from C. This process is depicted in FIG. 3. The verifier can be the CA, an escrow authority, or anyone else who knows the system parameters.

The verification process of FIG. 3 is as follows. In step 3009, the user generates a public/private key pair, and a certificate using the invention as described above. In step 3010, the user transmits a signal containing these parameters to a verifier. In step 3011 the verifier uses this signal to verify whether or not the user's private key is recoverable by the escrow authorities. To do so, the verifier uses the user's public key, the corresponding certificate, and the escrowing public key 2tn.

The way in which the users signal is processed will now be described in detail. The verifying system outputs a 0 if the public key and/or certificate are invalid, and a 1 otherwise. The invention may take subsequent action and indicate to the verifier that the public key is invalid in the event that 0 is returned. Similarly, the verifying system may inform the verifier of a validation that passes.

To perform the verification, the verifying system verifies the three non-interactive proofs contained within the certificate of the user. The invention computes $(b_{1,i}, b_{2,i}, b_{3,i})$ for i ranging from 1 to N in the same way as performed during the certificate generation process. Recall that this process was described in regards to FIG. 2.

For the first non-interactive proof, the verifying system checks that $I_{1,i} C = z_{1,i}^3 \mod 2tn$ if $b_{1,i} = 1$, for i ranging from 1 to N. The verifying system also checks that $I_{1,i} = z_{1,i}^3 \mod 2tn$ if $b_{1,i} = 0$, for 1 ranging from 1 to N. If any of these equalities fails, then the verifying system returns a value of 0. This completes the verification of the first non-interactive proof.

For the second non-interactive proof, the verifying system checks that $I_{2,i} = g$ raised to the $(z_{2,i}^2 \mod 2tn)$ power mod p if $b_{2,i} = 1$, for i ranging from 1 to N. The verifying system also checks that $I_{2,i} = y$ raised to the $(Z_{2,i}^2 \mod 2tn)$ power mod p if $b_{2,i} = 0$, for i ranging from 1 to N. If any of these equalities fail, then the verifying system returns a value of 0. This completes the verification of the second non-interactive proof.

For the third non-interactive proof, the invention checks that $I_{3,i} = g$ raised to the $(Z_{3,i}^5 \mod 2tn)$ power mod p if $b_{3,i} = 1$, for i ranging from 1 to N. The invention also checks that $I_{3,i} = (y^C \mod p)$ raised to the $(z_{3,i}^5 \mod 2tn)$ power mod p if $b_{3,i} = 0$, for i ranging from 1 to N. If any of these equalities fails, then the verifying system returns a value 0. If all of the verifications pass, then the value 1 is output by the verifying system.

Figure 4:
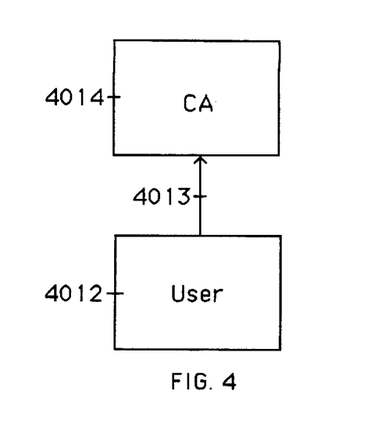
FIG. 4 is a data flow diagram of the process of registering a key using the invention.

In FIG. 4, the user certifies his or her public key with the CA. In step 4012 of this process, the user generates his or her public key and certificate of recoverability, as previously described. The user transmits this signal to the CA. This corresponds to step 4013 of FIG. 4. In step 4014 the CA acts as a verifier and verifies that the user's private key is recoverable by the escrow authorities.

So far, steps 4012 through 4014 are identical to steps 3009 through 3011 in the key verification process of FIG. 3. However the CA, in addition, will make keys that pass the verification process available to others upon request and/or certify them. If the user's public key fails the verification process, then either the certification attempt is ignored, or alternatively the user is notified of the failed certification attempt.

Depending on the demands of the environment in which the invention is used, users may be required to submit extra information in order to register a public key and to certify that they know the private key portion without divulging it. Such information could be a password, social security number, previously used private key, etc. In the case that the CA is a trusted entity, the CA can simply digitally sign the user's public key together with the user's name and additional information, and make the key along with the CA's signature on this information available on request. If the CA is not trusted, then the certificate should be stored in the public file and the certificate together with the certificate of recoverability should be given to the escrow authorities, who in turn can insure recoverability. This completes the description of the public key certification process.

Figure 5:
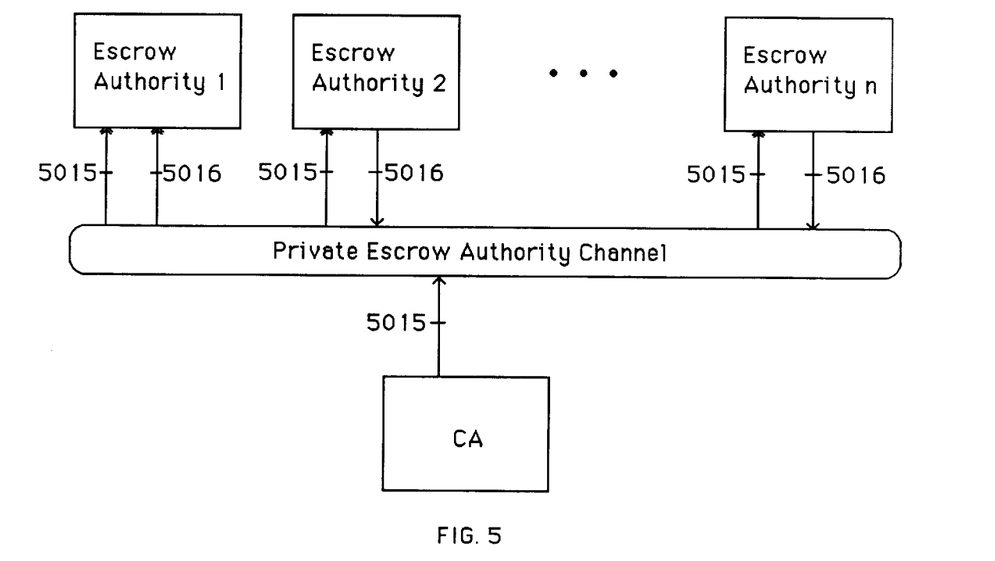
FIG. 5 is a data flow diagram of the process of private key recovery by the escrow authorities.

The last process to describe is the private key recovery process. This process is depicted in FIG. 5. In this process, the invention is used by the m escrow authorities to recover the user's private key based on C. In this process, all m of the escrow authorities obtain C, as depicted in step 5015 of FIG. 5. In an alternate embodiment the CA transmits C and/or other parameters to one or more of the authorities. Thus they are already in possession of C. At this point escrow authorities use a subset of their shares $d_1, d_2, \ldots, d_m$ to decrypt C to get x'. Given x', x is found by computing $x = x'^2 \mod 2tn$. There are alternative methods in the art for computing x' so that x' is represented distributively among the authorities.

Figure 6:
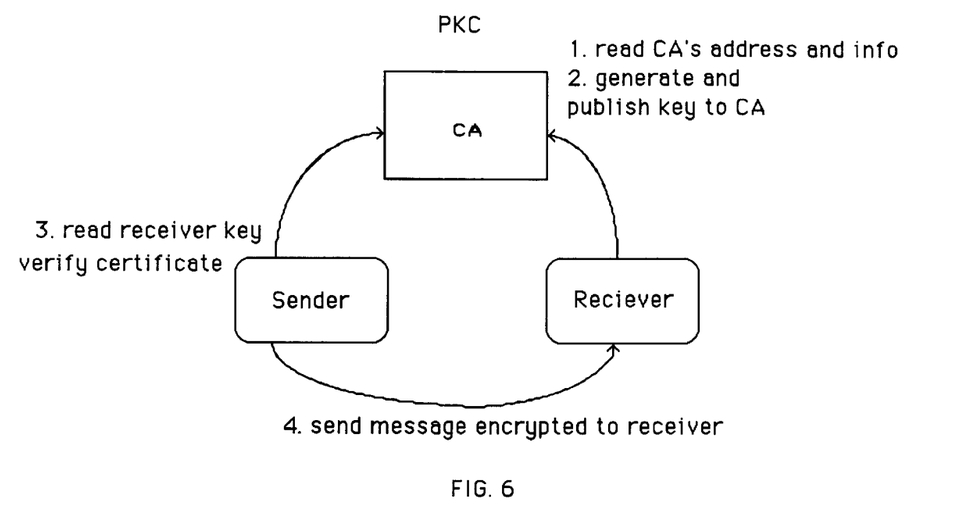
FIG. 6 describes a generic public key system and its main components and operations FIG. 7 describes the escrowable public key system which results by employing the present invention and its main components and operations.
Figure 7:
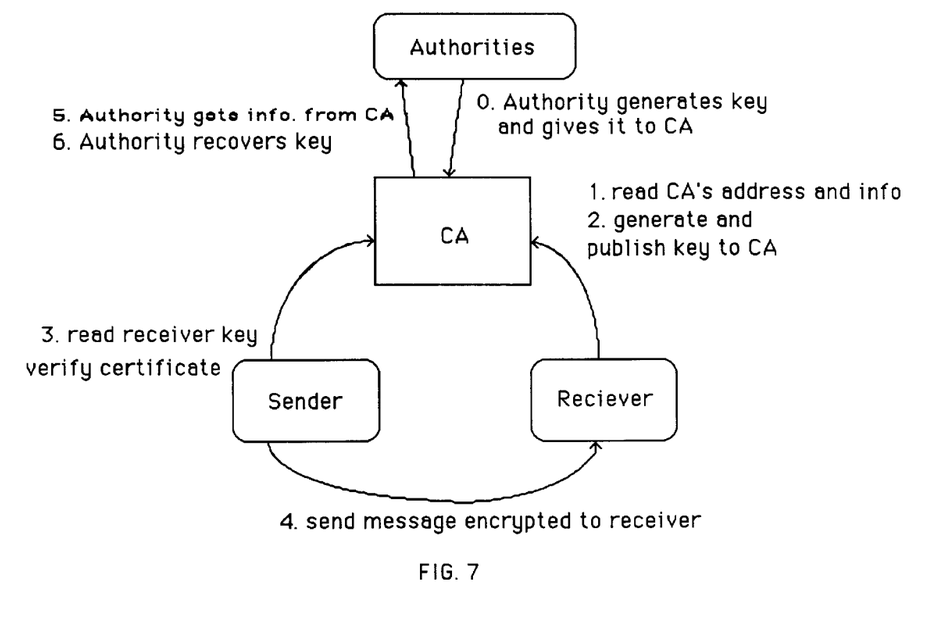

What has been described is an Auto-Recoverable and Auto-Certifiable (ARC) cryptosystem where the system parameters can be generated very easily. The users of such a cryptosytem employ the public key system in a way that is identical to a typical PKI for secure communications. This is demonstrated schematically in FIGS. 6 and 7. FIG. 6 is a typical public key cryptosystem in a PKI environment. The following are the steps that are followed by the users. (1) The user first reads the CA's information and address. (2) The user generates a public/private key pair and sends the public key to the CA. The registration of the authority in the CA verifies the identity of the user, and publishes the public key together with the CA certificate on that key, identifying the user as the owner of that key. (3) For another user to send a message to that user, the public key is read from the CA's database and the certificate is verified. (4) Then, the message is encrypted under new the public key and sent. FIG. 7 schematically describes the ARC cryptosystem. The additional operations are as follows. (0) The authority generates the escrowing public key and gives it to the CA. Steps 1 and 2 are analogous, except that a proof is sent along with the public key. Steps 3 and 4 are the operation of the system and are identical. Steps 5 and 6 describe the case in which keys are recovered from escrow. (5) The escrow authority gets information from the CA. (6) The escrow authority recovers the user's private key.

The authorities can require that that the certificate of recoverability be sent along with the public key and encryption so that the user's parameters can first be verified using the verification process. This completes the description of the private key recovery process.

In another embodiment, the interactive versions of the three non-interactive proofs can be used. Such an embodiment requires that the system output x' to the user during key generation. This value x' is used during the interactive protocol, so that the verifier can be convinced that the user's private key is recoverable by the escrow authorities. Note that by outputting any of the non-interactive zero-knowledge proofs, a shadow public key cryptosystem may result. This follows from the fact that the values for z can be chosen by a malicious user.

In yet another embodiment, the CA, or other trusted entity, takes the further action of cryptographicly blinding the certificate of recoverability. Blinding is typically done by exponentiating a modular exponentiation by a given factor. It also holds for multiplication. See (D. Chaum, "Blind Signatures for Untraceable Payments", CRYPTO '82, pages 199–203, Springer-Verlag, 1982) for more on blinding. Blinding is done as follows. The user commits to his values. The CA or a third party sends the blinding factors to the user. The non-interactive proofs are then constructed based on the blinded values. This prevents users from exploiting subliminal channels, and the resulting certificate of recoverability can be published. In particular, the certificate of recoverability can be part of the CA's certificate for the given user, which typically also includes the user name, the user's public key, and other information.

An application of this invention is a multi-escrow authority system where each escrow authority has its own CAs and users. When users from two different escrow authorities conduct secure communication the two escrow authorities can retrieve the user's messages or keys and exchange them through bilateral agreement. This is applicable to international multi-country scenarios.

Another application of key escrow systems is a secure file system or file repository system with recoverable keys. Such a system can be implemented based on the previous embodiments, in particular based on the preceding paragraph. For example, user A can be the owner of the file, user B can be the file server, and the trustees can be file recovery agents. An example of a file could be a password, in which case, the file recovery agents are password recovery agents.

Yet another application of this invention is a certified electronic mailing system. When the users register into the system, they register an auto-recoverable encryption public key and a certificate of recoverability to the CA, and they also register a signature public key. To send a certified piece of mail, the following is done. The sender sends a packet which includes the following: an encryption of an e-mail key under his own auto-certified public key, the receiver's name, an encryption of the e-mail message encrypted under the e-mail key, a header indicating a certified e-mail message, his own certified public key, and the CA's certificate on his certified public key, and other information. The packet is signed using the senders signature private key. Both the packet and the signature on the packet are sent to the receiver. The receiver forms a return receipt packet that consists of a fixed return receipt header, the received message (or the hash of the received message), and additional information. This packet is signed using the receivers private signature key and is sent to the original sender. The original sender verifies the signature on the return receipt packet. If the signature is valid, the original sender sends the receiver the e-mail key encrypted under the receiver's certified public key. This message is sent along with a signature on it using the original sender's private signing key. The receiver verifies the signature on the encrypted e-mail key. If the signature is valid, the receiver decrypts the e-mail key using his private decryption key. The receiver then encrypts the result using the original senders certified public key. If the result matches the ciphertext in the first packet that the original sender sent, then the e-mail key is regarded as authentic. This key is then used to decrypt and obtain the actual information that the original sender sent. If the receiver is for some reason unable to contact the original sender after the first packet is received, the receiver sends the return receipt and the first packet to the escrow authorities. The escrow authorities will recover the e-mail key, provided the packet and return receipts are authentic and provided that the packet contains the corrects receivers name. The escrow authorities retain the return receipt and the packet. Provided the checks pass, the e-mail key is sent to the receiver. This constitutes a certified e-mail system based on auto-recoverable keys and signature keys, and where user registration is analogous to user registration in a typical public key system with a CA. Also, it is known in the art how to employ certified e-mail systems as above for contract signing between two parties. The above application can be used as such.

Thus, there has been described a new and improved key escrow system, its variants, and applications. It is to be understood that the prefered embodiment is merely illustrative of some of the many specific embodiments which represent applications of the principles and paradigms of the present invention. Clearly, numerous and alternate arrangements can be readily devised by those who are skilled in the art without departing from the scope of the present invention.

References Cited

U.S. PATENT DOCUMENTS

U.S. Pat. No. 4,200,770 to Hellman (1980)
U.S. Pat. No. 4,218,582 to Hellman (1980)
U.S. Pat. No. 4,405,829 to Rivest (1983)
U.S. Pat. No. 4,424,414 to Hellman (1984)
U.S. Pat. No. 4,641,346 to Clark (1987)
U.S. Pat. No. 4,748,668 to Shamir et al. (1988)
U.S. Pat. No. 4,881,264 to Merkle (1989)
U.S. Pat. No. 4,933,970 to Shamir (1990)
U.S. Pat. No. 4,995,082 to Schnorr (1991)
U.S. Pat. No. 5,005,200 to Fischer (1991)
U.S. Pat. No. 5,097,504 to Camion et al. (1992)
U.S. Pat. No. 5,276,737 to Micali (1994)
U.S. Pat. No. 5,315,658 to Micali (1994)
U.S. Pat. No. 5,557,765 to Lipner et al. (1996)

OTHER PUBLICATIONS

R. Anderson, "The GCHQ Protocol and Its Problems", Eurocrypt '97, pages 134–148, Springer-Verlag, 1997.
D. Denning, D. Branstad, "A Taxonomy for Key Escrow Encryption Systems", Communications of the ACM, v. 39, n. 3, 1996.
A. De Santis, Y. Desmedt, Y. Frankel, M. Yung, "How to Share a Function Securely", ACM STOC '94, pages 522–533, 1994.
W. Diffie, M. Hellman, "New directions in cryptography", IEEE Transactions on Information Theory, 22, pages 644–654, 1976.
T. ElGamal, "A Public-Key Cryptosystem and a Signature Scheme Based on Discrete Logarithms", CRYPTO '84, pages 10–18, Springer-Verlag, 1985.
P. Feldman, "A practical scheme for non-interactive verifiable secret sharing", 28th annual FOCS, pages 427–437, 1987.
A. Fiat, A. Shamir, "How to Prove Yourself: Practical Solutions to Identification and Signature Problems", CRYPTO '86, pages 186–194, Springer-Verlag, 1987.
IBM, SecureWay, Key recovery technology document, available at http://www.ibm.com/Security/html/wp-keyrec.html (downloaded May 25, 1997).
N. Jefferies, C. Mitchell, M. Walker, "A Proposed Architecture for Trusted Third Party Services", Cryptography: Policy and Algorithms, LNCS 1029, Springer, 1996.
J. Kilian, F. Leighton, "Fair Cryptosystems Revisited", CRYPTO '95, pages 208–221, Springer-Verlag, 1995.
S. Micali, "Fair Public-Key Cryptosystems", CRYPTO '92, pages 113–138, Springer-Verlag, 1992.
B. Schneier, "Applied Cryptography, 2nd edition", pages 442–445, Wiley, 1996.
E. Verheul, H. Tilborg, "Binding ElGamal: A Fraud-Detectable Alternative to Key-Escrow Proposals", Eurocrypt '97, pages 119–133, Springer-Verlag, 1997.
S. Walker, J. Winston, "Principles for Use of Encryption and Key Recovery", available at http://www.tis.com/docs/products/recoverkey/recoverkey.html (downloaded May 25, 1997).

What we claim is:

1. A method for generating public keys (y,g,p) and a proof (C,P1,P2,P3) that the keys were generated by a specific algorithm comprising the steps of:

choosing a value x' in $(Z_{2m})^*$ uniformly at random;

computing $C = X'^3 \mod 2tn$;

computing $x = X'^2 \mod 2tn$;

computing the public key $y = 2g^x \mod p$;

computing P1, a non-interactive zero-knowledge proof of knowledge of x' in C;

computing P2, a non-interactive zero-knowledge proof of knowledge of x' in y;

computing P3, a non-interactive zero-knowledge proof of knowledge of x' in $y^C \mod p$;

and where the user's public key is (y,g,p) and the user's private key is x and where the proof that the public key (y,g,p) was generated by this specific algorithm is the string (C,P1,P2,P3) such that said proof serves as means to implement a certificate of recoverability of the private key x corresponding to said public key (y,g,p) to be given to an authority for verification.

2. A method for generating public keys (y,g,p) and proving that the keys were generated by a specific algorithm comprising the steps of:

choosing a value x' in $(Z_{2m})$ uniformly at random;

computing $C = x'X^3 \mod 2tn$;

computing $x = x'Y^2 \mod 2tn$;

computing the public key $y = g^x \mod p$;

conducting P1, an interactive zero-knowledge proof of knowledge of x' in C;

conducting P2, an interactive zero-knowledge proof of knowledge of x' in y;

conducting P3, an interactive zero-knowledge proof of knowledge of x' in $y^C \mod p$;

and where user's public key is (y,g,p) and the user's private key is x and where the transcript of said interactive zero-knowledge proofs P1,P2, and P3 serves as a means to implement a certificate of recoverability of the private key x corresponding to said public key (y,g,p) to be given to an authority for verification.

* * * * *